(12) United States Patent
Nielsen

(10) Patent No.: US 8,444,354 B2
(45) Date of Patent: May 21, 2013

(54) MOUNTING/ASSEMBLY ELEMENT FOR ASSEMBLING WORKPIECES, PARTICULARLY OVERLAPPING PLATES AND/OR COMPONENTS

(75) Inventor: Hans Nielsen, Vinderup (DK)

(73) Assignee: HN3D Holding ApS, Vinderup (DK)

( * ) Notice: Subject to any disclaimer, the term of this patent is extended or adjusted under 35 U.S.C. 154(b) by 518 days.

(21) Appl. No.: 12/601,444

(22) PCT Filed: May 22, 2008

(86) PCT No.: PCT/DK2008/050117
§ 371 (c)(1),
(2), (4) Date: Nov. 23, 2009

(87) PCT Pub. No.: WO2008/141653
PCT Pub. Date: Nov. 27, 2008

(65) Prior Publication Data
US 2010/0166522 A1    Jul. 1, 2010

(30) Foreign Application Priority Data
May 23, 2007    (DK) .................................. 2007 00755

(51) Int. Cl.
*F16B 13/04* (2006.01)
(52) U.S. Cl.
USPC .............................. 411/43; 411/351; 411/501
(58) Field of Classification Search
USPC .................. 411/39, 40, 42, 43, 72, 351, 360, 411/501
See application file for complete search history.

(56) References Cited

U.S. PATENT DOCUMENTS

| 2,759,082 | A | * | 8/1956 | Rea | 219/150 R |
|---|---|---|---|---|---|
| 3,203,303 | A | * | 8/1965 | Laisy | 411/39 |
| 3,309,747 | A | * | 3/1967 | Smith | 24/688 |
| 3,451,303 | A | * | 6/1969 | Biermann | 411/70 |
| 3,866,998 | A | * | 2/1975 | Iantorno | 439/870 |
| 3,941,027 | A | * | 3/1976 | Gibson et al. | 411/43 |
| 4,012,984 | A | * | 3/1977 | Matuschek | 411/34 |
| 4,560,312 | A |   | 12/1985 | Grady |  |
| 4,636,122 | A | * | 1/1987 | Rooney | 411/45 |
| 4,639,175 | A | * | 1/1987 | Wollar | 411/38 |
| 4,781,500 | A | * | 11/1988 | Mauer | 411/36 |
| 4,967,463 | A | * | 11/1990 | Pratt | 29/525.06 |

(Continued)

FOREIGN PATENT DOCUMENTS
DE        39 02 226  A1    8/1990

*Primary Examiner* — Roberta Delisle
(74) *Attorney, Agent, or Firm* — Roberts Mlotkowski Safran & Cole, P.C.; David S. Safran

(57) ABSTRACT

A mounting/assembly element rivet bush having a deformable first end for insert through items to be connected and a second end for mounting a nut. A draw tool having a break zone is located in the first end of the rivet bush, and the second end of the rivet bush is provided with a non-cylindrical internal cross section which cooperates with an insertion tool, such as an Allen wrench. When the mounting/assembly element is held fast in the items to be connected, the part of the break zone of the draw tool for the deformation of the rivet bush is lying in the deformable first end of the rivet bush. A counter-hold for torsion forces which arise with the dismounting and remounting of the nut is produced with the insertion tool thereby achieving a considerably greater tightening effect and also ensuring that the mounting/assembly element can be reused.

18 Claims, 3 Drawing Sheets

U.S. PATENT DOCUMENTS

| | | | | |
|---|---|---|---|---|
| 4,990,042 A | * | 2/1991 | Szayer et al. | 411/29 |
| 5,246,323 A | * | 9/1993 | Vernet et al. | 411/29 |
| 5,252,014 A | * | 10/1993 | Andrews | 411/43 |
| 5,762,456 A | * | 6/1998 | Aasgaard | 411/29 |
| 5,915,901 A | * | 6/1999 | Aasgaard | 411/29 |
| 6,796,759 B2 | * | 9/2004 | Aasgaard | 411/29 |
| 7,033,120 B2 | * | 4/2006 | Hufnagl et al. | 411/34 |
| 2003/0215303 A1 | * | 11/2003 | Makino | 411/39 |
| 2004/0047704 A1 | * | 3/2004 | Wirth et al. | 411/43 |

* cited by examiner

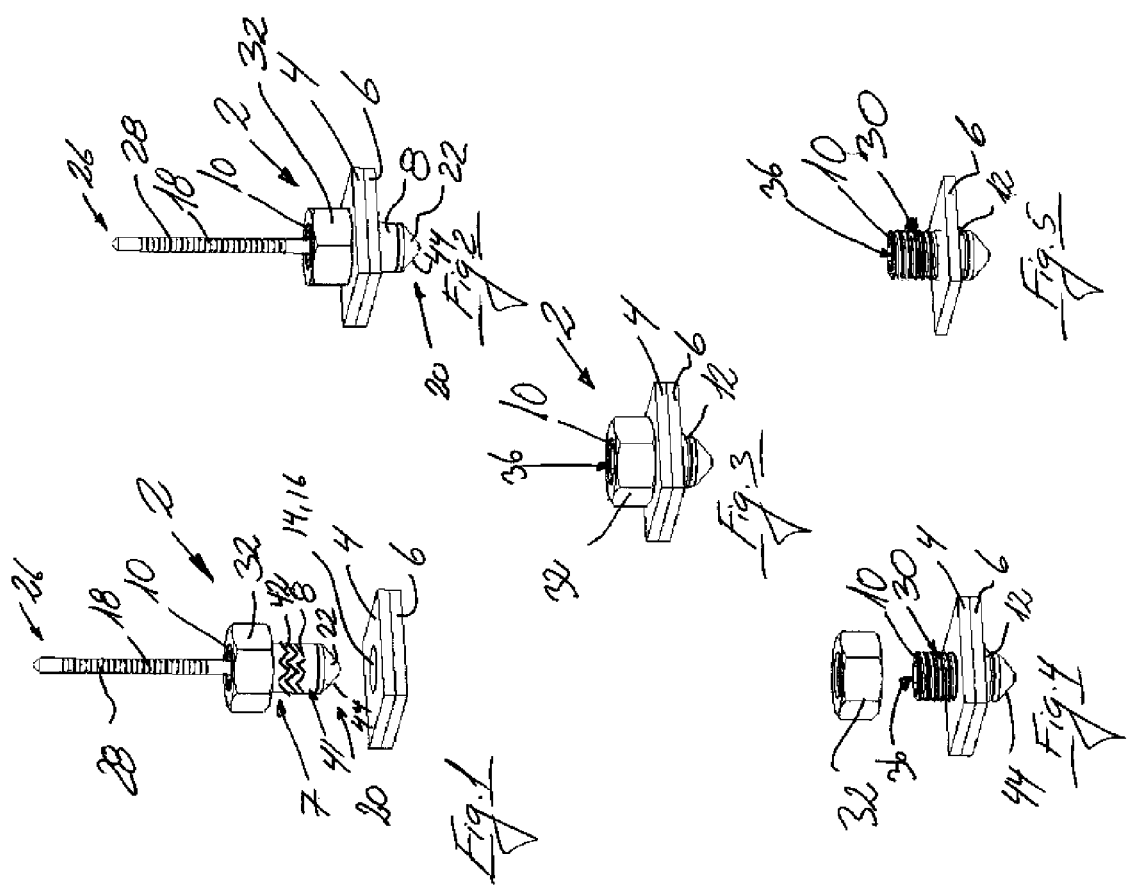

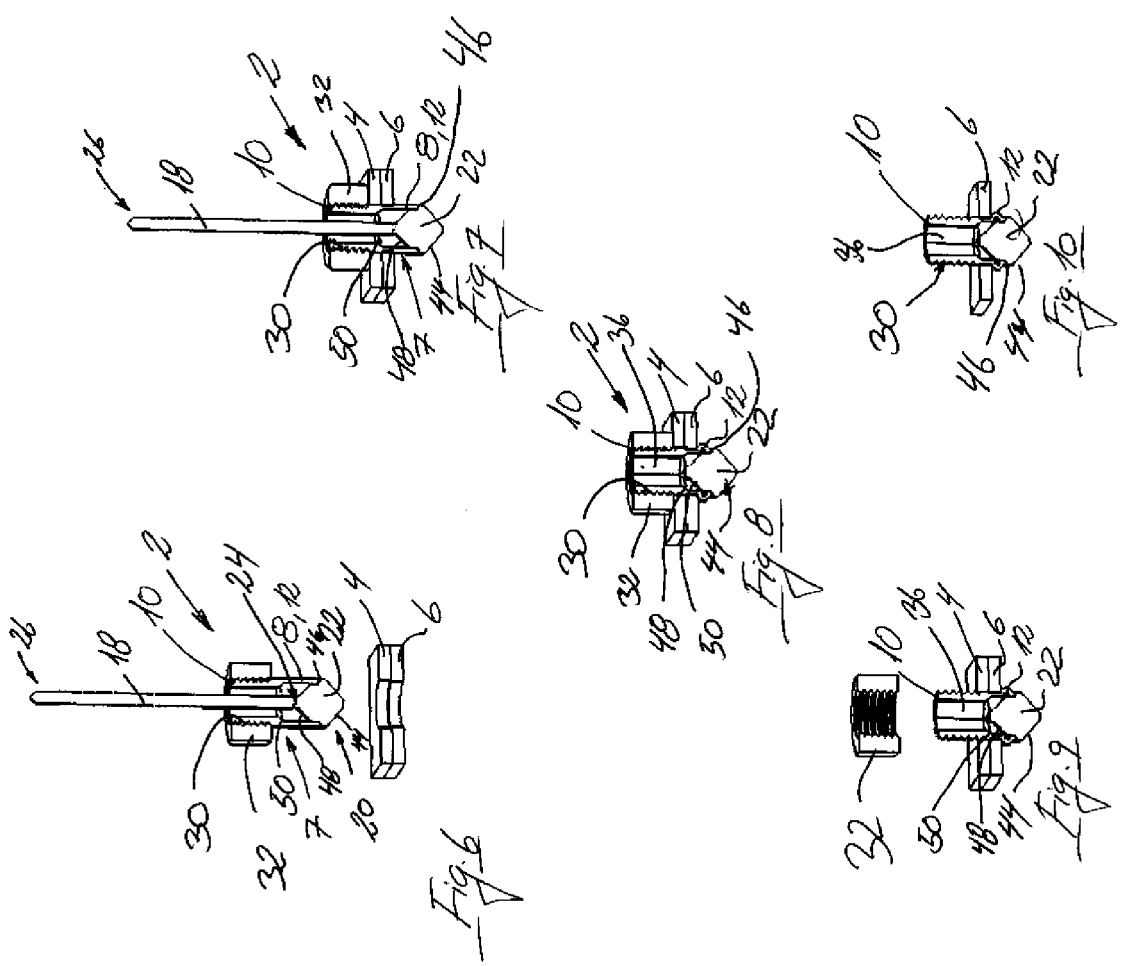

MOUNTING/ASSEMBLY ELEMENT FOR ASSEMBLING WORKPIECES, PARTICULARLY OVERLAPPING PLATES AND/OR COMPONENTS

BACKGROUND OF THE INVENTION

1. Field of Invention

The present invention relates to a mounting/assembly element for use in the assembly of items, particularly overlapping plate parts and/or components, and comprising a rivet bush with a first end and a second end, and where the first end comprises a deformable zone for insertion through holes lying over each other in the items, and where there is housed a draw-rod in the rivet bush, the first end of which comprises a draw-head with a larger diameter than the draw-rod and a break zone above the draw-head which is housed in the deformable zone of the rivet bush, and where the second end of which extends up over the second end of the rivet bush, and where the second end of the rivet bush comprises an external thread on which there is provided a cooperating nut, said mounting/assembly element being intended for fastening by use of a drawing tool engaged in the draw-rod for breakage in the break zone.

2. Description of Related Art

Such a mounting/assembly element is known from German Patent Application DE 39 02 226 A1, where there is disclosed a mounting assembly element comprising a rivet bush, the insertion end of which comprises a deformation zone, in which rivet bush there is provided a draw-rod comprising a break zone, where the draw-rod by being drawn upon by a drawing tool carries out a deformation of the rivet bush's deformation zone, and with continued traction a breakage occurs in the break zone, so that the pointed end of the draw-rod remains housed inside the rivet bush, the outer walls of which are pressed against the walls of the parts which the mounting element holds assembled. When the mounting assembly element is mounted, i.e., after the draw-rod has broken in the break zone, the break zone of that part of the draw-rod which is connected to the draw-head will be placed in the rivet bush, outside the end of the rivet bush opposite the deformation zone.

The special aspect of this mounting element is that the end of the rivet bush, opposite the deformation zone, extending from the surface of the parts in which the fastening element is mounted, has an external thread on which there is provided a cooperating nut which constitutes the element's contact surface against a surface of a relevant item. The nut can thus be loosened, whereby the item which is fastened by means of one or more of said fastening elements, can be dismounted and mounted with a commonly known hand tool, without the necessity of having to remove/drill-out the rivet bush, and without the necessity of having access to that part of the rivet bush which is fastened in the underlying construction part. Furthermore, the advantage is that the bolt can be used as a form of security-sealing, in that an attempt to loosen the bolt will leave score/scratch marks in the surface of the item fastening by the mounting element.

However, the fastening element disclosed in German Patent Application DE 39 02 226 A1 has the weakness that the rivet bush, in the dismounting and mounting of the nut, can sometimes not withstand the turning moment which is applied to the nut, in that the rivet bush simply turns around with the nut when the turning moment exceeds the frictional force which is established by the fastening of the rivet bush in a relevant hole in the construction in which the mounting element forms part. To counter this, the external side of the deformation zone of the rivet bush has been provided with a grooving with the object of improving the anchoring of the rivet bush in a hole arranged in a relevant item/plate part, so that the ability of the rivet bush to withstand the turning moment is increased.

This, however, has proved to be inadequate, and in the use of said known mounting element, it has thus not been possible to establish sufficient resisting moment to be able to dismount and remount the nut on the element without the rivet bush turning around in its seating in the lowermost construction part. Also, the mounting element has not found application with more strength-demanding fastenings. Moreover, the mounting element will not be suitable for fastening/mounting of parts on locations where vibrations arise, e.g., on machine parts where use is sometimes made of locking fluid to ensure that the nut remains in the preferred position.

From U.S. Pat. No. 4,560,312, there is known a fastening element comprising a threaded draw-rod, the end of which opposite the thread comprises a draw-bar and a bush comprising a deformable zone in the one end and a contact flange in the other end, for inserting through overlapping holes in construction elements which are to be assembled, where the flange is intended for contact respectively with a facing surface of the construction elements, and a nut on the threaded draw-rod, arranged for the tightening of the draw-bar so that the deformation zone of the bush is deformed by the draw-bar, whereby the flange is pressed against the facing surface of the construction elements which are thereby assembled. In order to carry out the tightening of the nut, it is necessary to be able to secure the draw-rod, so that, in the threaded end of the draw-rod, there is a recess to accommodate a cooperating insertion too, intended as a counter-hold for turning moments which arise with the tightening of the nut on the draw-rod against the flange on the bush, for deformation of the bush's deformable zone, on the opposite side of the construction elements. The nut can be dismounted by use of the insertion tool.

It is important to understand that the mounting element disclosed in U.S. Pat. No. 4,560,312 only permits its utilization for the assembly or fastening on construction elements providing that a deformation of the bush's deformation zone is carried out by a regular tightening of the nut on the threaded end of the draw-rod, so that the nut is brought into contact with the flange on the bush, whereby the draw-head on the draw-rod with continued tightening of the nut effects a deformation of the bush's deformable zone, and the drawing of this into contact with the side of the construction elements facing away from the flange. This means that, in the mounting of the mounting element, use must be made of a tightening tool for the nut, and also an insertion tool cooperating with the recess for creating the counter-hold necessary for the tightening of the nut. Other things being equal, this will involve a slow, time-consuming and difficult mounting procedure for the mounting element, which will hardly be attractive with the demands for efficiency which are made today in connection with the assembly of construction elements. Moreover, said mounting elements hardly find application in connection with an automated assembly of construction elements, for example in connection with assembly robots.

SUMMARY OF THE INVENTION

It is the object of the invention to provide a mounting/assembly element of the type described above which makes possible a harder tightening of the nut on the threaded part of the rivet bush, and therewith a more stable fastening, and which also allows the use of locking fluids, without the anchored part of the rivet bush turning around during dismounting of the nut.

A further object of the invention is to disclose a fastening element which makes quick mounting possible, for example, with known mounting tools, or with robots, at the same time that the above-mentioned object is achieved.

These objects are achieved with a mounting/assembly element having a rivet bush with a first end and a second end, where the first end has a deformable zone for introduction through coinciding holes in the items, and a draw-rod housed in the rivet bush, a first end of which has a draw-head with a larger diameter than the draw-rod and a break zone above the draw-head which is housed in the deformable zone of the rivet bush, and where the second end of the draw-bar extends up over the second end of the rivet bush, and where the second end of the rivet bush has an external thread on which a cooperating nut is provided, the draw-bar being engageable by a drawing tool for fastening until a break occurs in the break zone, by the second end of the rivet bush also having a non-cylindrical inside cross-section, and in the element's firmly-mounted state, either the part of the break zone connected with the draw-head is lies in the first end of the rivet bush, or the break zone lies in the lower half-part of the second end of the rivet bush facing towards the draw-head.

The possibility is achieved for insertion of a tool in that part of the rivet bush where its outer side comprises a thread and nut, so that the tool can be used as counter-hold for neutralizing the torsion moment on the rivet bush during dismounting of the nut. The insertion end of the tool is adapted to the internal non-circular cross-section of the rivet bush, and therefore, can be a special tool for safeguarding against unauthorized dismounting of the nut. Moreover, the element allows itself to be mounted with the use of a traction tool, for example, commonly-known drawing pliers, thereby enabling the implementation of a quick mounting of the element. The quick mounting can be made further effective with use of robot tools comprising the necessary traction tool, the fastening element being mounted as an insertion part which is introduced through two overlapping holes in the items being connected. The draw rod is influenced by traction for deformation of the deformable part of the rivet bush until breakage, so that the remaining part of the draw-rod connected with the draw-head will be localized in the deformable zone of the rivet bush, or alternatively, in the lower end of the threaded end of the rivet bush, so that there is room for introduction of an insertion tool cooperating with the non-cylindrical inside cross-section for establishing of counter-hold in connection with the dismounting and mounting of the nut.

Attempts to dismount the nut will be revealed by the formation of scratches in the surface on the side of the item facing the nut. Therefore, the need for the use of specially made tools will be small. This characteristic is not offered with the use of the fastening element which is known from U.S. Pat. No. 4,560,312, where tightening of the nut will leave scratch marks on the facing side of a relevant construction element.

With the object of making the use of the mounting/assembly element more universal, the inside non-cylindrical cross-section in the second end of the rivet bush can have a cross-section which is suitable for cooperating engagement with an insertion tool, chiefly a standard insertion tool.

It is hereby achieved that the nut can be loosened by use of standard tools which can be obtained on the general market. For example, the non-cylindrical cross-section could be hexagonal, so that it provides for cooperating engagement with a corresponding hexagonal key, e.g., of the UNBRAKO® socket type. The nut is thus loosened by first inserting a suitable standard hexagon key in the opening of the rivet bush, and thereafter, the application of a suitable open-ended/adjustable wrench corresponding with the outer geometry of the nut, after which the nut is removed by turning the open-ended/adjustable wrench while, at the same, time holding the hexagon key in the initial position, whereby the rivet bush is held in its position without turning around in its seating in the underlying item.

With the object of ensuring a quick insertion of the assembly element in connection with use, the free end of the draw-head can have a pointed, conical extent. There is hereby achieved a quick centering and introduction of an assembly element in overlapping holes in items which are to be joined together with the assembly element.

With the object of ensuring an effective contact surface between the first end (deformation zone) of the rivet bush and the draw-head, and to ensure a uniform deformation of the deformation zone during traction on the draw-rod, over the conical extent between this and the break zone there can be a recess against which the first end of the rivet bush is in contact. Contact is thereby achieved against the whole periphery of the rivet bush, which will thus be deformed uniformly during the deformation procedure during the drawing/displacement of the head.

With the object of ensuring a large as possible contact surface between the rivet bush and the side of the item against which the external side of the rivet bush's deformation zone is in contact, the draw-head between the recess and the break zone on the draw-rod can have a conical extent which corresponds to an internal conical extent in the transition between the first and the second end of the rivet bush.

With the object of ensuring a better friction between the outer side of the rivet bush and the facing side of the item, the outside surface of the rivet bush's deformation zone can be grooved. In the fastening of the rivet bush, the grooving will grip more firmly in the facing side of the item, which will counteract rotation of the rivet bush along with the nut during the dismounting of the nut. Moreover, the rivet bush will hereby also better withstand vibrations.

In a first special configuration of the grooving, it is preferred that the grooving on the outside surface of rivet bush's deformation zone is form of serrations.

In a second special configuration of the grooving, it is preferred that the grooving on the outside surface of rivet bush's deformation zone is formed of zig-zag grooving.

In a third special configuration of the grooving, it is preferred that the grooving on the outside surface of rivet bush's deformation zone is formed of helical grooving, with the pitch oriented towards the thread on the outside of the second side of the rivet bush.

With the object of providing good engagement facilities for the draw tool which is used for the fastening of the assembly element, the outside surface of the draw-rod, in the end opposite the break zone, can comprise grooving or corrugations. The possibility is thereby achieved of establishing a better grip as a result of the greater friction between the elements of the draw tool and the draw-rod.

With the object of ensuring that unauthorised attempts to dismount the nut on the assembly element are revealed, also on relatively hard surfaces, the side surface of the nut facing towards the deformation zone of the rivet bush can be corrugated or grooved. As a result, there is a greater probability that in the turning of the nut in connection with attempts at dismounting, scratch marks are formed on item surfaces facing towards the grooving/corrugations, also even though the surface of the item is relatively hard, whereby unauthorized dismounting of the nut, or attempts to dismount the nut, are revealed with greater probability.

In the following, the invention is explained in more detail with reference to the accompanying drawings.

BRIEF DESCRIPTION OF THE DRAWINGS

FIG. 1 is a perspective view of a mounting/assembly element according to the invention, immediately before insertion through overlapping holes in two overlaid plate items which are to be joined together by the assembly element.

FIG. 2 is a perspective view of the mounting/assembly element shown in FIG. 1, inserted into overlapping holes in two overlaid plate items.

FIG. 3 is a perspective view of the mounting/assembly element shown in FIGS. 1 & 2, where the rivet bush of the assembly element is fastened/anchored in the lowermost plate item.

FIG. 4 is a perspective view of the mounting/assembly element shown in FIGS. 1-3, where the nut has been dismounted.

FIG. 5 is a perspective view of the mounting/assembly element shown in FIG. 4, where the nut and the upper plate item are removed, ready for mounting.

FIG. 6 is a perspective sectional view of the mounting/assembly element according to the invention shown in FIG. 1.

FIG. 7 is a perspective sectional view of that shown in FIG. 2

FIG. 8 is a perspective sectional view of that shown in FIG. 3

FIG. 9 is a perspective sectional view of that shown in FIG. 4

FIG. 10 is a perspective sectional view of that shown in FIG. 5

DETAILED DESCRIPTION OF THE INVENTION

Figure 11:
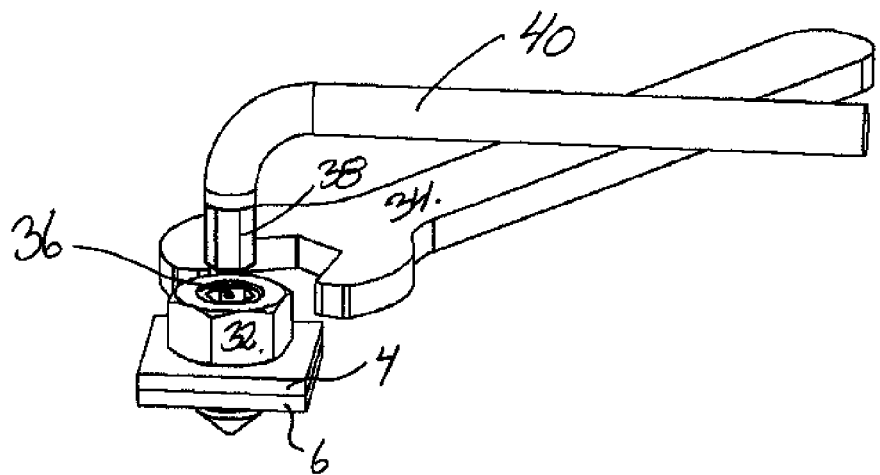
FIG. 11 is a perspective sectional view of the example embodiment of the mounting/assembly element shown in FIGS. 1-10 during the insertion of a tool for dismounting of the nut.

In FIG. 1, a first embodiment of the mounting/assembly element 2 for use in the assembly of items, particularly overlapping plate parts 4, 6, and components, is shown.

The mounting/assembly element 2 comprises a rivet bush 7 with a first end 8 and a second end 10. As is shown more clearly in FIGS. 6-10, the first end 8 comprises a deformable zone 12 for insertion through coincident holes 14, 16 in the items 4, 6, and in the rivet bush 7, there is housed a draw-rod 18, the first end 20 of which comprises a draw-head 22 with a greater diameter than the draw-rod 18 and a break zone 24 above the draw-head 22.

The draw-head 22 is housed in the deformable zone 8, 12 of the rivet bush. The second end 26 of the draw-rod 18 extends up out of the second end 10 of the rivet bush 7, and in the illustrated embodiment, comprises a corrugation 28 which serves to provide a better grip for the draw tool which is used for the mounting/fastening of the element 2 in the lowermost plate item 6.

The second end 10 of the rivet bush also comprises an external thread 30 on which there is provided a cooperating nut 32, which in the mounting of the element 2 serves as a counter-hold for fastening of the uppermost plate part 4, as will appear from FIGS. 4 & 8. The nut 32 can be loosened with the use of commonly known tools, as will appear from FIGS. 11 & 12. The tool can consist of an open-ended or adjustable wrench 34, a box wrench or similar tools which are able to engage with the external geometry of the nut 32.

Figure 12:
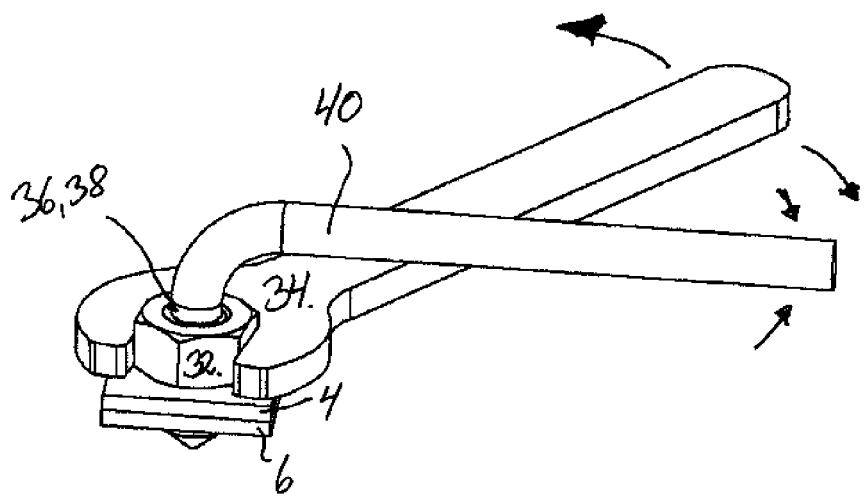
FIG. 12 is a view as in FIG. 11, but where the tool has been inserted for dismounting/mounting of the nut.

As already mentioned, the second end 10 also comprises a non-cylindrical internal cross-section 36, as indicated in FIGS. 3-5, and FIGS. 8-10, but which appears more clearly in FIG. 11. In the shown embodiment, the non-cylindrical internal cross-section consists of a hexagonal profile 36, for example, an Unbrako® type socket, the geometry of which cooperates with the insertion end 38 of a hexagonal key 40, such as an Allen wrench, which, as indicated in FIG. 12 can be used as counter-hold in connection with the mounting and dismounting of the nut 32.

The turning moments (both directions) which should otherwise be absorbed by the frictional forces between the outside of the first end of the rivet bush and the sides of the holes 24, 16 in the plate items 4, 6 and the rear side of the lower plate item 6, will thus be taken up by the counter-hold established by the hexagonal key 40 inserted in the second end 10 of the rivet bush, whereby the co-turning of the first end of the rivet bush with the turning of the nut is avoided, both in the dismounting as well as the mounting of the nut 32. The advantage herewith is significant, in that the mounting/assembly element 2 according to the invention can be tightened considerably harder during the mounting than is possible with the known technique, since regard does not have to be paid to torsion forces on the end 8 of the rivet bush anchored in the lower plate item 6, and since the dismounting of the nut 32 can take place without applying a turning moment to the first end 8 of the rivet bush, because a counter-hold can be established with insertion tool 40 for absorbing the moment, for example a hexagonal key 38 in the illustrated embodiment of the mounting/assembly element 2 according to the invention, so that the rivet bush does not turn around together with the nut 32 during the mounting and dismounting of the nut 32.

Since, with the use of the mounting/assembly element according to the invention, there can be established a counter-hold during the dismounting of the nut 32, it will also be possible to use locking fluids in connection with the element according to the invention, which makes it particularly suitable for use in the mounting of cover plates on machines and other places where vibrations arise, and where experience has shown that, with time, such mounting elements can work loose, and where protection against unauthorized access is desired.

As will appear from FIG. 1, the first end 8 of the rivet bush 8 can comprise a grooving 42 on the external side 41 which serves to establish a better engagement in the hole 16 and the lower item 6 in the mounting of the mounting/assembly element 2 according to the invention.

As will appear from FIGS. 6-10, between the recess 46 and the break zone 24 on the draw-rod 28, the draw-head 22 also comprises a conical section 48 which corresponds to an internal conical section 50 in the transition between the first end 8 and second end 10 of the rivet bush.

As will further appear from FIG. 10, the draw-head has an external conical extent 44 which will ease the introduction of the mounting element into overlapping holes 14, 16 in plate items 4, 6, or other items which shall be assembled with the mounting/assembly element 2 according to the invention. This means, among other things, that the element will more easily be able to be mounted in a mechanical manner, i.e., with robots or other automated tools.

As will further appear from FIGS. 6-10, above the external conical section 44 there is a recess 46 against which the first end of the rivet bush 7 is in contact. With this configuration of the draw-head, there is achieved a uniform deformation of the deformable zone 12 of the rivet bush, so that this is drawn uniformly against relevant parts of the mounting element or the plate in which it is mounted.

The mounting/assembly element 2 is used as follows, where reference is made to FIGS. 1-10.

Two overlapping plates 4, 6 with holes 14, 16 of diameters suitable for the mounting element 2, are placed so that the holes 14, 16 are coincident. A mounting element 2 is inserted into the holes 14, 16, as will appear from FIGS. 2-7, with the first end 8 of the rivet bush inserted in the holes 14, 16, and with the nut 32 in contact with the facing side of the uppermost item 4, after which traction is applied to the draw-rod 18 by a tool (not shown), which will result in a deformation of the deformable zone 12 of the rivet bush, so that the rivet bush is hereby fastened to the lower plate item 6. By the continued application of traction on the draw-rod 18, the rod will break at the break zone 24, which also, after full deformation of the deformable zone 12, lies in the first end of the now deformed zone of the rivet bush. The mounting/assembly element 2 is now anchored in the lower plate item 6, and the upper plate item 4 is hereafter fixed by the nut 32, the surface of which facing the surface of the plate 4 is drawn into contact against the plate 4. With the removal of the now broken-off part of the draw-rod 18, there is now free access to the non-cylindrical cross section 36 on the inside of the second end 10 of the rivet bush 7, the external side of which comprises a thread 30 on which the nut 32 is mounted, as will appear from FIGS. 3 & 8.

The dismounting/mounting of the nut 32 from the second end 10 of the rivet bush, as will appear from FIGS. 4, 5, 9 & 10 takes place by inserting the free end 38 of a suitable insertion tool 40 with a non-cylindrical internal cross-section into the opening 36, and bringing a suitable adjustable open-ended wrench into engagement with the nut 32, after which and at the same time that a force is applied to the wrench 34, a corresponding force is applied on the insertion tool 40, whereby the nut 32 can be dismounted without the rivet bush turning around together with the nut, and after dismounting of the nut 32 the upper plate item can be removed. As a consequence of the friction between the nut 32 and the surface of the upper plate item 4, the turning of the nut will result in the formation of score marks in the surface of the plate, which will reveal that the plate has been removed.

The remounting of the nut 32 takes place in the same way as described above, though merely in the opposite order, with the nut 32 being turned with the key 34 at the same time that the insertion tool 40 secures the rivet bush 7 in its position.

What is claimed is:

1. Mounting assembly for use in the assembling of items, comprising a rivet bush with a first end having a deformable zone for introduction through coinciding holes in the items and a second end having an external thread on which a cooperating nut is provided, and a draw-rod housed in the rivet bush, a first end of the draw-rod having a draw-head housed in the deformable zone, the draw-head having a larger diameter than the draw-rod and a break zone being formed between the draw-rod and the draw-head, and a second end of the draw-bar extending out of the second end of the rivet bush, drawing on the second end of the draw-rod being adapted to cause collapsing of the deformable zone, for fixing the rivet bush in the items being assembled, until a break occurs in the break zone, wherein the second end of the rivet bush has a non-cylindrical internal cross-section for receiving a tool for enabling dismounting of the nut after the draw-rod has been broken and the deformable zone collapsed, and wherein, in a dismounted state of the rivet bush, the break zone lies in the first end of the rivet bush.

2. Mounting element according to claim 1, wherein the internal non-cylindrical cross-section in the second end of the rivet bush is hexagonal.

3. Mounting assembly according to claim 1, wherein a free end of the draw-head has a pointed, conical section, and wherein, between the conical section and the break zone, a recess is provided against which the first end of the rivet bush is in contact.

4. Mounting assembly according to claim 3, wherein the draw-head has a second conical section between the recess and the break zone.

5. Mounting assembly according to claim 1, wherein an outside surface of the deformable zone is provided with a grooving.

6. Mounting assembly according to claim 5, wherein the grooving on the outside surface of the deformable zone is comprised of serrations.

7. Mounting assembly according to claim 6, wherein the grooving on the outside surface of the deformable zone is a zig-zag grooving.

8. Mounting assembly according to claim 5, wherein the grooving on the outside surface of the deformable zone is helical with the pitch oriented towards said thread on the second end of the rivet bush.

9. Mounting assembly according to claim 1, wherein the outside surface a portion of the draw-rod extending out of the second end of the rivet bush has a grooving or a corrugation.

10. Mounting assembly for use in the assembling of items, comprising a rivet bush with a first end and a second end, where the first end has a deformable zone for introduction through coinciding holes in the items, and a draw-rod housed in the rivet bush, a first end of which has a draw-head with a larger diameter than the draw-rod and a break zone above the draw-head which is housed in the deformable zone of the rivet bush, and where the second end of the draw-rod extends up over the second end of the rivet bush, and where the second end of the rivet bush has an external thread on which a cooperating nut is provided, drawing on the second end of the draw-rod being adapted to cause collapsing of the deformable zone, for fixing the rivet bush in the items being assembled, until a break occurs in the break zone, wherein the second end of the rivet bush has a non-cylindrical internal cross-section for receiving a tool for enabling dismounting of the nut after the draw-rod has been broken and the deformable zone collapsed, and wherein, in a mounted state of the rivet bush with the deformable zone collapsed, after breaking of the draw-rod, a remainder of the break zone lies in a lower half part of the second end of the rivet bush facing away from the draw-head.

11. Mounting assembly according to claim 10, wherein the internal non-cylindrical cross-section in the second end of the rivet bush is hexagonal.

12. Mounting assembly according to claim 10, wherein a free end of the draw-head has a pointed, conical section, and wherein, between the conical section and the break zone, a recess is provided against which the first end of the rivet bush is in contact.

13. Mounting assembly according to claim 12, wherein the draw-head has a second conical section between the recess and the break zone.

14. Mounting assembly according to claim 10, wherein an outside surface of the deformable zone is provided with a grooving.

15. Mounting assembly according to claim 14, wherein the grooving on the outside surface of the deformable zone is comprised of serrations.

16. Mounting assembly according to claim 15, wherein the grooving on the outside surface of the deformable zone is a zig-zag grooving.

17. Mounting assembly according to claim 14, wherein the grooving on the outside surface of the deformable zone is helical with the pitch oriented towards said thread on the second end of the rivet bush.

18. Mounting assembly according to claim 10, wherein the outside surface a portion of the draw-rod extending out of the second end of the rivet bush has a grooving or a corrugation.

* * * * *